United States Patent [19]

Stewart et al.

[11] Patent Number: 5,028,806

[45] Date of Patent: Jul. 2, 1991

[54] BATTERY REPLACEMENT SYSTEM FOR BATTERY-POWERED DIGITAL DATA HANDLING DEVICES

[75] Inventors: Gregory N. Stewart; John P. Busch, both of Austin, Tex.

[73] Assignee: Dell Corporate Services Corporation, Austin, Tex.

[21] Appl. No.: 338,267

[22] Filed: Apr. 14, 1989

[51] Int. Cl.⁵ .................................................. H02J 9/04
[52] U.S. Cl. .......................................... 307/66; 307/85
[58] Field of Search ...................... 307/64, 66, 85, 149, 307/150; 361/391, 412, 415

[56] References Cited

U.S. PATENT DOCUMENTS

| | | | |
|---|---|---|---|
| 4,079,440 | 3/1978 | Ohnuma et al. | 361/409 |
| 4,191,917 | 3/1980 | Brown et al. | 307/150 |
| 4,232,377 | 11/1980 | Tallman | 307/150 |
| 4,528,459 | 7/1985 | Wiegel | 307/66 |
| 4,675,538 | 6/1987 | Epstein | 361/415 |
| 4,760,277 | 7/1988 | Vurpillat | 307/64 |

Primary Examiner—A. D. Pellinen
Assistant Examiner—Jeffrey A. Gaffin
Attorney, Agent, or Firm—Thomas G. Devine

[57] ABSTRACT

A battery-powered lap-top computer has a main battery for ordinarily supplying power to the computer circuitry. A reserve battery is connected through an automatic switch to the circuitry. The circuitry is connected to a pair of contacts and the switch is connected to a contact. The main battery has positive and negative terminals, and a removal terminal which is shorter in length than the positive and negative terminals. When the main battery loses its charge, it is removed by a sliding action which slides the terminals past the contacts, the removal terminal being the first terminal to lose contact. This activates the automatic switch, connecting the reserve battery into the circuitry so that when the positive and negative terminals are no longer contacted, the reserve battery will have been supplying and will continue to supply power to the circuitry. A charged main battery is then installed, deactivating the switch, removing the reserve battery from the circuitry. Provision is made for the main battery to slowly charge the reserve battery.

24 Claims, 4 Drawing Sheets

BATTERY REPLACEMENT SYSTEM FOR BATTERY-POWERED DIGITAL DATA HANDLING DEVICES

BACKGROUND OF THE INVENTION

1. Field of the Invention

This invention relates to battery-powered electronic devices. More specifically, it relates to a battery replacement system for battery-powered digital data handling devices.

2. Description of the Prior Art

When the battery in a battery-operated computer becomes discharged while the computer is in use, the battery has to be replaced. To replace the battery in prior art systems, the following steps ordinarily had to be taken:

(a) Save the work file.
(b) Exit the current program.
(c) Turn the computer off.
(d) Remove the discharged battery.
(e) Replace with a new battery.
(f) Apply power to the computer.
(g) Wait for the power-up sequences of tests and initialization.
(h) Invoke the current program.
(i) Load the work file.

This prior art procedure can take appreciable time, depending on the complexity of the program.

To overcome the disadvantages of this procedure, prior art lap-top computers have made use of a special memory for storing the contents of the main memory and also that of the contents of the internal registers of the microprocessor component of the computer. This special memory is a very low-powered, expensive static-type memory typically limited, by cost, to approximately 640K bytes. As battery-powered computers have became more complex, the memory size has increased to where those computers with 640K bytes are impractical since the state-of-the-art capacity is now up to 8 megabytes. Static memory of this size would be prohibitive in cost and would be physically too large.

Another prior art system is involved with writing the contents of the registers and the main memory into a disk memory before the computer is shut down for battery replacement. However, the power requirement in that type of system is high annd, furthermore, all of the registers in the current microprocessor structures are not susceptible of being read out and preserved. Therefore, the exact state of the microprocessor cannot be saved before turning the power off for battery replacement.

According to the present invention, the power is maintained throughout the battery replacement process, insuring preservation of all memory and contents of operational registers.

BRIEF SUMMARY OF THE INVENTION

The battery-powered electronic device (lap-top computer in this preferred embodiment), has a reserve battery to maintain the computer in operation while the main battery is being replaced. The main memory component and the microprocessor component of the computer have power maintained to them and, therefore, the contents of the memory and the working register contents of the microprocessor are all saved. When the new main battery is installed, the reserve battery is automatically removed from the circuit and is charged very slowly by the main battery to insure that it will be fully charged and ready for use when the main battery is discharged and must again be removed. The reserve battery is used only as a power source when the main battery is removed and is, therefore, not discharged along with the main battery.

In this preferred embodiment, the main battery is a battery-pack formed of nine "C" size batteries, an engineering selection. Obviously, other types and numbers of batteries could be used. The battery pack has positive and negative terminals, and a removal terminal all located at its surface. The removal terminal, in this preferred embodiment, is connected to the positive terminal, but could obviously be connected to the negative terminal as well. The removal terminal is shorter in length than the positive and negative terminals. A battery tray is provided within the housing of the computer for receiving the main battery pack, with contacts located within the battery tray to contact the three terminals. To remove the main battery pack, it is necessary to slide it out of the battery tray be sliding the terminals against the contacts. The removal terminal is shorter and therefore the electrical connection between the removal terminal and the contact is broken before the electrical connections are broken with respect to the positive and negative terminals. The broken electrical connection between the removal terminal and contact activates an automatic switch which then switches the reserve battery into the circuitry before the main battery has been removed from the circuit, thus insuring no loss of power during removal.

A new main battery is then inserted into the battery case causing the automatic switch to the off position, removing the reserve battery from the circuit. A charging circuit connects the main battery pack to the reserve battery to provide a charge to the reserve battery so that it is fully charged when the main battery again requires changing.

The principle object of this invention is to provide a battery-powered electronic device with a reserve battery to enable removal of a discharged main battery and replacement thereof without major interruption to the power supplied to the circuitry of the electronic device.

This and other objects will be made evident in the detailed description that follows.

DETAILED DESCRIPTION OF THE INVENTION

This invention enables the removal and reinstallation of the main battery of a battery-operated electronic device be made without major interruption of the activity of the electronic device. The following detailed description illustrates how this is accomplished.

Figure 1:
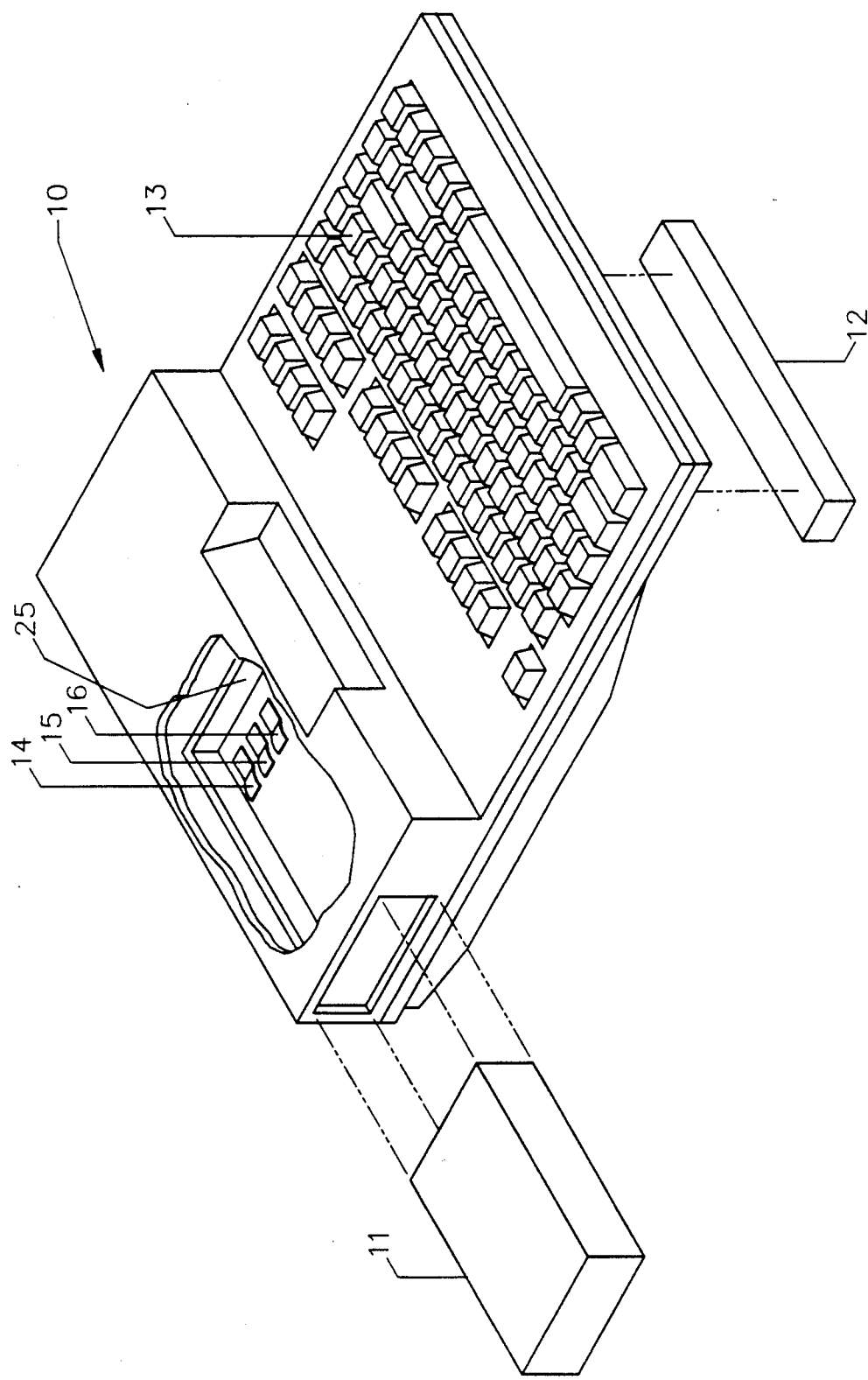
FIG. 1 is a partially cut-away, partially exploded perspective view of the lap-top computer of this invention.

FIG. 1 illustrates lap-top computer 10 having a main battery (battery pack) 11 shown removed from battery tray 25 and away from contacts 14–16. Reserve battery 12 is shown removed from its normal position under keyboard 13. In this preferred embodiment, reserve battery 12 is a battery pack consisting of eight "AA" batteries, an engineering selection. Obviously, other types and numbers of batteries could be used as well.

Figure 2:
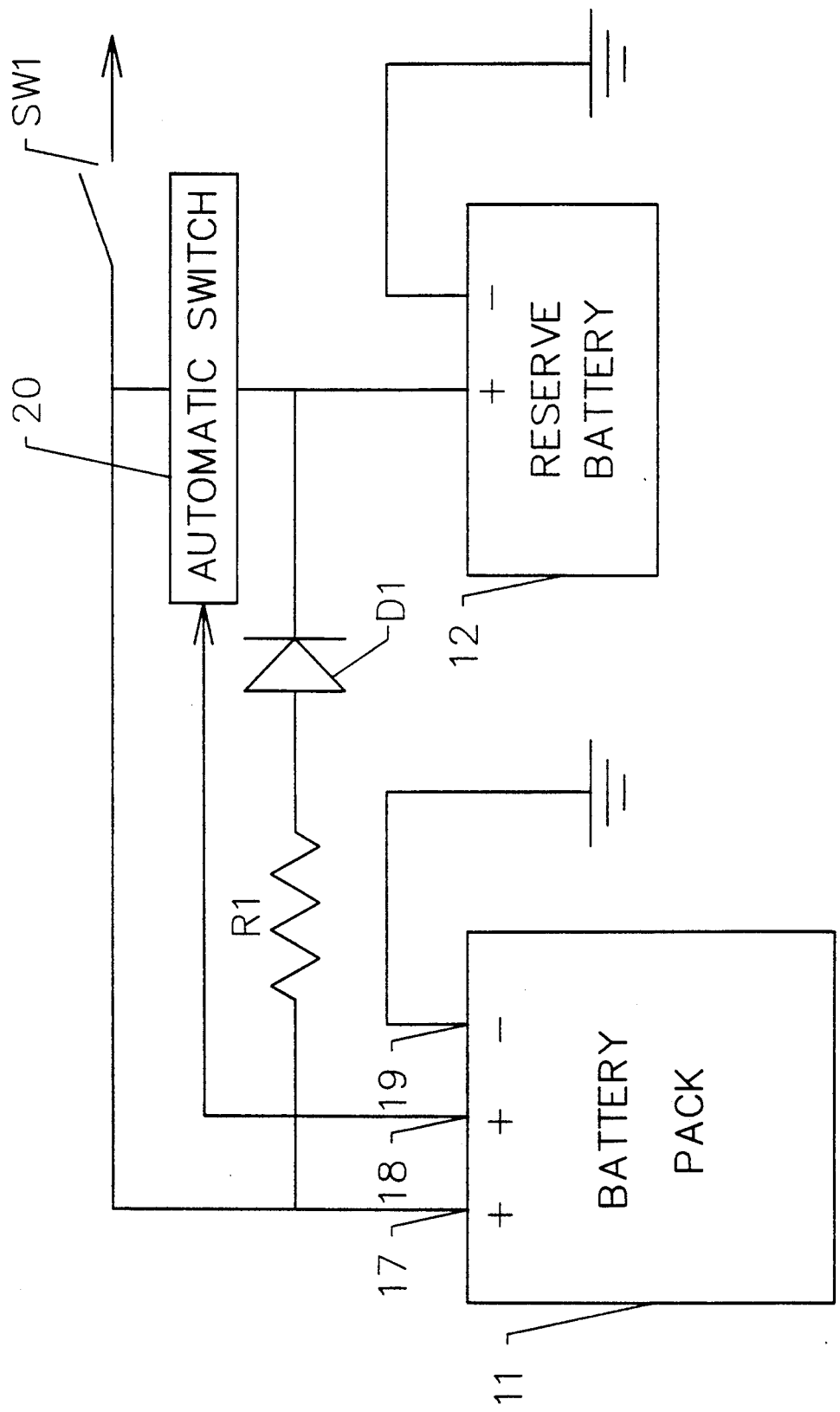
FIG. 2 schematically illustrates the battery pack (main battery), the reserve battery, the automatic switch, and the charge circuit of this invention.

FIG. 2 illustrates battery pack 11 having its positive terminal 17 attached to on/off switch SW1 which is connected to the computer circuitry. Negative terminal 19 is connected to ground. Removal terminal 18 is connected to automatic switch assembly 20, which is, in turn, connected to on/off switch SW1. Reserve battery 12 has its positive terminal connected to automatic switch assembly 20 and its negative terminal connected to ground. Thus, when automatic switch assembly 20 is closed, reserve battery 12 has its positive output connected through on/off switch SW1 to the computer circuitry.

Figure 3:
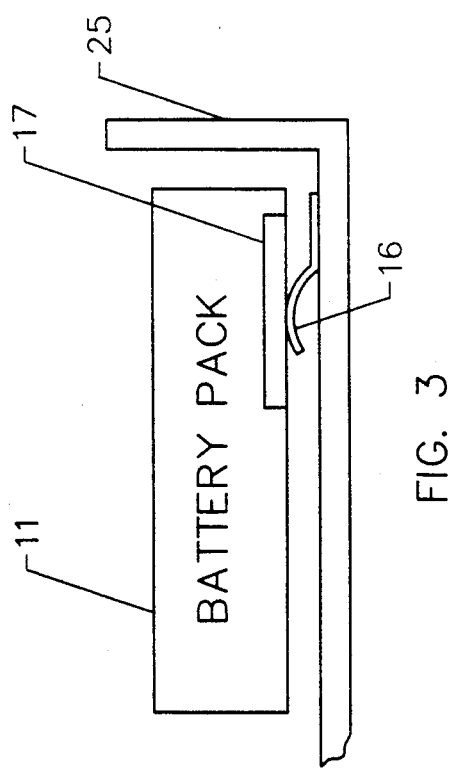
FIG. 3 is a cut-away side elevation of the battery pack in position in the battery tray.

FIG. 3 illustrates battery pack 11 in place in battery tray 25 with contact 16 bearing against terminal 17.

Figure 4:
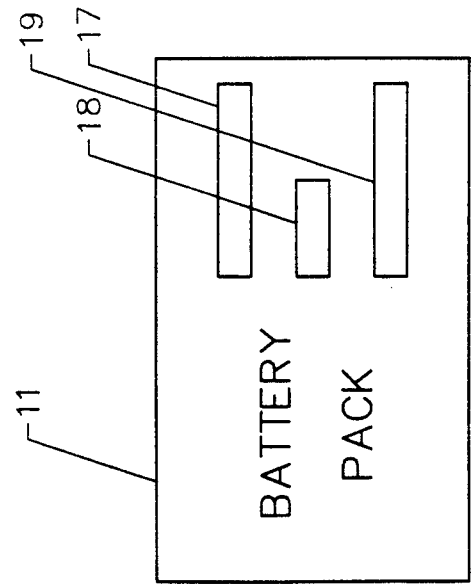
FIG. 4 is a bottom view of the battery pack.

FIG. 4, is a bottom view of battery pack 11 showing positive and negative terminals 17 and 19, respectively, and removal terminal 18. Please note that removal terminal 18 is substantially shorter than terminals 17 and 19.

Figure 5:
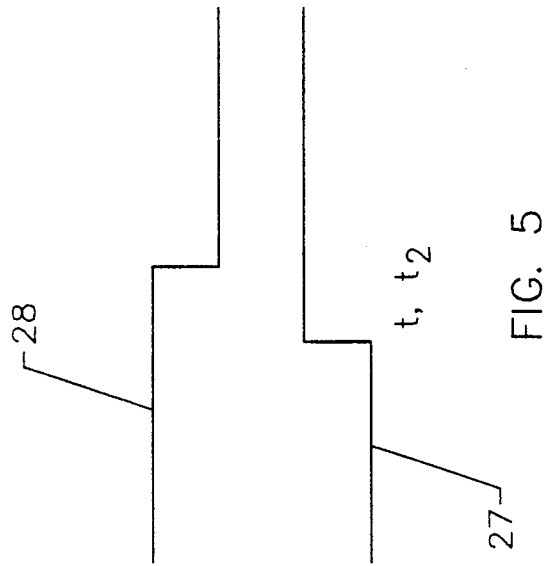
FIG. 5 illustrates power output from the battery pack and the reserve battery, respectively.

FIG. 5 illustrates voltage 28 from battery pack 11 declining to zero at time $t_2$ indicating when terminals 17 and 19 lose electrical connection with contacts 16 and 14, respectively. Voltage 27 from reserve battery 12, going from zero to an operational voltage level at time $t_1$ is shown, well in advance of time $t_2$ to assure continuous power to computer 10.

Figure 6:
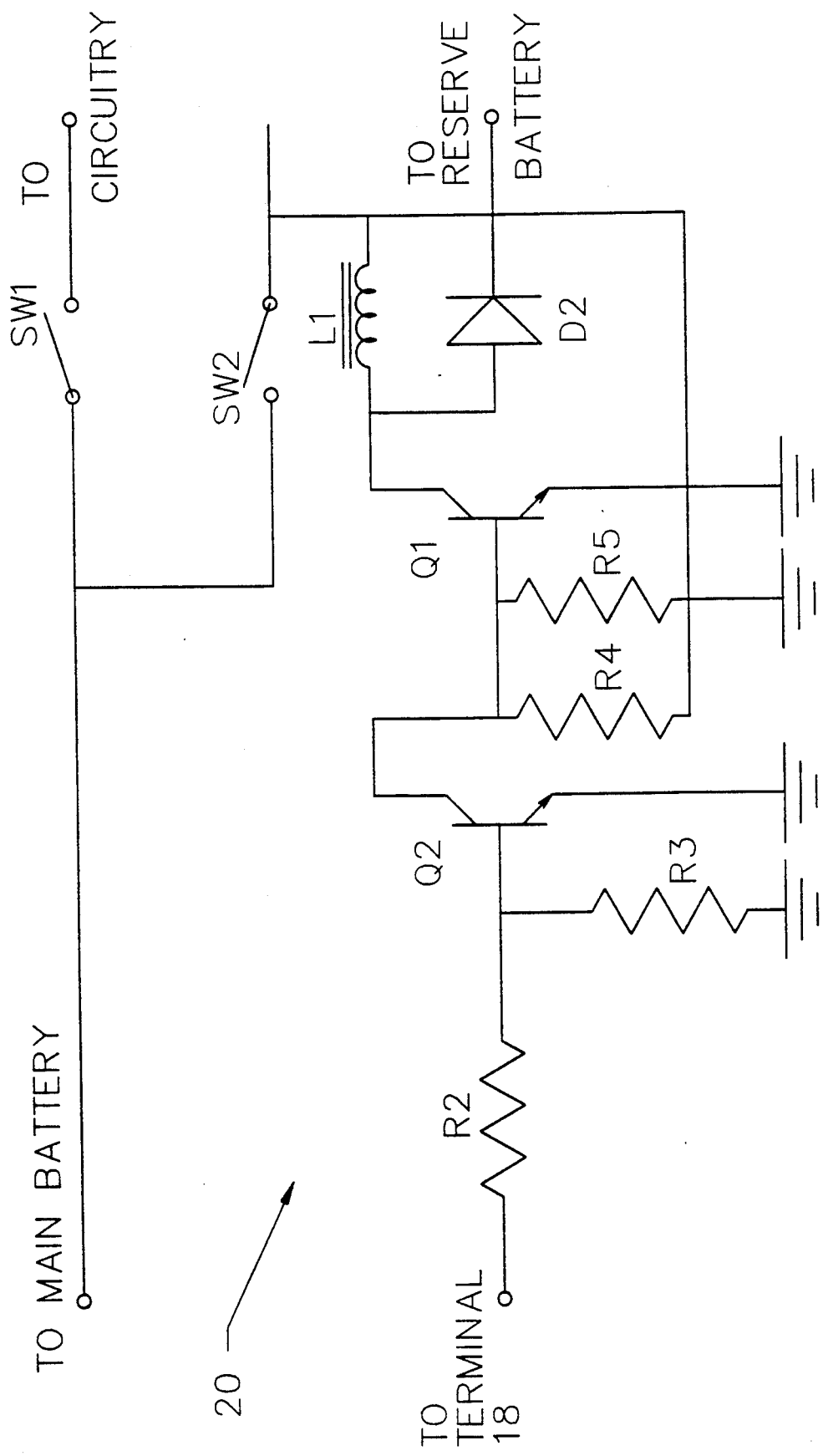
FIG. 6 is a schematic diagram of the automatic switch.

In FIG. 6, the schematic details of automatic switch assembly 20 are shown. A voltage network, connected to removal terminal 18 is connected to the base of transistor Q2 and is made up of resistors R2 and R3, with resistor R2 connected between terminal 18 and the base of transistor Q2, and resistor R3 connected from the base of transistor Q2 to ground. The emitter of NPN transistor Q2 is connected to ground and its collector is connected to the base of NPN transistor Q1. Resistor R5 is also connected the base of transistor Q1 at one end and to ground at the other end. The emitter of transistor Q1 is connected to ground and its collector is connected to inductor L1 and to the anode of diode D2. The cathode of diode D2 and the other end of inductor L1 are tied together and connected to switch SW2 and the positive terminal of the reserve battery, and also through resistor R4 to the base of transistor Q1. Inductor L1 and switch SW2 form a relay where switch SW2 is activated by the field generated in inductor L1. The other side of switch SW2 is connected to the switch SW1, the main on/off switch which is connected to the computer circuitry.

MODE OF OPERATION

When battery pack 11 begins to lose its charge and must be replaced, it is pulled out of battery tray 25, best illustrated in FIG. 1. As battery pack 11 is pulled out, connection between removal terminal 18 and contact 15 is broken before the connections between positive and negative terminals 17 and 19 and contacts 16 and 14, respectively, are broken.

Referring now to FIG. 6, transistor Q2 is ordinarily turned on by the positive voltage ordinarily present between resistors R2 and R3. With transistor Q2 conducting, transistor Q1 is ordinarily cut off because of the ground potential on its base. When removal terminal 18 is disconnected from contact 15, tansistor Q2 is cut off by the ground potential on its base and transistor Q1 is turned on by a positive voltage from reserve battery 12 being applied to its base through resistor R4. When transistor Q1 is turned on, current is conducted through conductor L1, closing relay switch SW2. Diode D2 simply serves as a bypass for conductor L1 when the circuit is opened. When relay switch SW2 closes, reserve battery 12 is connected directly into the circuit through switch SW1, as shown. Therefore, when positive and negative terminals 17 and 19 lose connection with contacts 16 and 14, respectively, power is always available, as indicated in FIG. 5. Voltage 27 from reserve battery 12 is shown being applied at time $t_1$, well in advance of the voltage 28 from the main battery pack 11 which goes to zero at $t_2$.

This procedure operates in reverse when a new battery pack 11 is installed. That is, because connection is made between main terminals 17 and 19 and contacts 16 and 14, before connection is made between removal terminal 18 and contact 15. When connection with terminal 18 is made, transister Q2 is again turned on, turning off transistor Q1, deactivating conductor L1 and opening switch SW2. Reserve battery 12 is thereby removed from the circuit.

However, as shown in FIG. 2, the charging circuit made up of resistor R1 and diode D1 connected between terminal 17 of battery pack 11 and the positive terminal of reserve battery 12 provides a charge from main battery 11 to reserve battery 12 so that reserve battery 12 is fully charged for its next use when battery pack 11 must be replaced.

It should be noted that many computer systems are provided with low power circuits to enable basic operations for a longer period of time when operating on reserve batteries. This feature, of course, could be incorporated in the computer system of this invention.

Those skilled in the art may change circuits and components, such as the automatic switch assembly 20 which could readily be made of all solid-state components, without departing from the spirit and scope of the invention which is limited only by the appended claims.

The invention claimed is:

1. A battery-powered digital data handling device, comprising:
    (a) a main battery for supplying power to the device circuitry;
    (b) a reserve battery for selectively supplying power to the device circuitry; and
    (c) an automatic switch, connected to the device circuitry for switching to the reserve battery upon removal of the main battery, to continuously maintain power to the device circuitry.

2. The device of claim 1 further comprising means for maintaining power from the main battery to the device circuitry during removal of the main battery until the reserve battery positively supplies power to the device circuitry to provide continuous power to the device circuitry during removal of the main battery.

3. A battery-powered digital data handling device, comprising:
    (a) a main battery for supplying power to the device circuitry wherein the main battery comprises a positive terminal and a negative terminal and a removal terminal connected to one of the positive and negative terminals;

(b) a reserve battery for selectively supplying power to the device circuitry;

(c) an automatic switch, connected to the device circuitry for switching to the reserve battery upon removal of the main battery, to continuously maintain power to the device circuitry; and (d) means for maintaining power from the main battery to the device circuitry during the removal of the main battery until the reserve battery positively supplies power to the device circuitry to provide the continuous power to the device circuitry during removal of the main battery.

4. The device of claim 3 wherein the means for maintaining power comprises a contact connected to the automatic switch for contacting the removal terminal and a pair of contacts connected to the device circuitry for contacting the positive and negative terminals, respectively.

5. The device of claim 4 wherein the device includes a housing, configured to contain the main battery and to allow removal of the main battery through a sliding motion.

6. The device of claim 5 wherein the means for maintaining power further comprises the formation of the positive and negative terminals as longer than the removal terminal and wherein the automatic switch is activated to connect the reserve battery to the device circuitry when power from the removal terminal is removed, whereby removing the main battery by the sliding motion removes power from the removal terminal before power is removed from the positive and negative terminals, activating the automatic switch and insuring a continuous supply of power to the device circuitry.

7. The device of claim 6 wherein the automatic switch comprises a relay.

8. The device of claim 7 wherein the automatic switch further comprises a first, normally conducting transistor, and a second, normally cut-off transistor, wherein the first transistor is connected to keep the second transistor cut off, and the second transistor is connected to the relay, so that when power is disconnected from the first transistor, the second transistor is turned on, and the relay is activated.

9. The device of claim 8 further comprising a charging circuit connected from the main battery to the reserve battery for maintaining the reserve battery in a charged state.

10. A method of replacing the main battery in a digital data handling device without losing power to the device circuitry, comprising the steps of:

(a) connecting a reserve battery, through an open switch, to the device circuitry;

(b) removing the main battery; and (c) automatically closing the open switch while removing the main battery so that the reserve battery supplies power to the device circuitry whereby power is continuously maintained to the device circuitry.

11. The method of claim 10 further comprising the steps of:

(d) installing the main battery; and (e) automatically opening the closed switch to disconnect the reserve battery from the device circuitry.

12. The method of claim 11, after the step of automatically opening the closed switch, further comprising the step of:

(f) charging the reserve battery from the main battery.

13. A battery replacement system for continuously maintaining power to an electrical load comprising:

(a) a main battery for supplying power to the load;

(b) a reserve battery for selectively supplying power to the load; and (c) an automatic switch, connected to the load for switching to the reserve battery upon removal of the main battery, to continuously maintain power to the load.

14. The system of claim 13 further comprising means for maintaining power from the main battery to the load during removal of the main battery until the reserve battery positively supplies power to the load to provide continuous power to the load during removal of the main battery.

15. A method of replacing the main battery in a battery replacement system without losing power to an electrical load, comprising the steps of:

(a) connecting a reserve battery, through an open switch, to the load;

(b) removing the main battery; and (c) automatically closing the open switch while removing the main battery so that the reserve battery supplies power to the load whereby power is continuously maintained to the load.

16. The method of claim 15 further comprising the steps of:

(d) installing the main battery; and (e) automatically opening the closed switch to disconnect the reserve battery from the load.

17. The method of claim 16, after the step of automatically opening the closed switch, further comprising the step of:

(f) charging the reserve battery from the main battery.

18. A battery replacement system for continuously maintaining power to an electrical load comprising:

(a) a main battery for supplying power to the load wherein the main battery comprises a positive terminal and a negative terminal, and a removal terminal connected to one of the positive and negative terminals;

(b) a reserve battery for selectively supplying power to the load;

(c) an automatic switch, connected to the load for switching to the reserve battery upon removal of the main battery, to continuously maintain power to the load; and (d) means for maintaining power from the main battery to the load during removal of the main battery until the reserve battery positively supplies power to the load to provide continuous power to the load during removal of the main battery.

19. The system of claim 18 wherein the means for maintaining power comprises a contact connected to the automatic switch for contacting the removal terminal and a pair of contacts connected to the load for contacting the positive and negative terminals, respectively.

20. The system of claim 19 wherein the system includes a housing, configured to contain the main battery and to allow removal of the main battery through a sliding motion.

21. The system of claim 20 wherein the means for maintaining power further comprises the formation of the positive and negative terminals as longer than the removal terminal and wherein the automatic switch is activated to connect the reserve battery to the load when power from the removal terminal is removed, whereby removing the main battery by the sliding motion removes power from the removal terminal before power is removed from the positive and negative terminals, activating the automatic switch and insuring a continuous supply of power to the load.

22. The device of claim 21 wherein the automatic switch comprises a relay.

23. The device of claim 22 wherein the automatic switch further comprises a first, normally conducting transistor, and a second, normally cut-off transistor, wherein the first transistor is connected to keep the second transistor cut off, and the second transistor is connected to the relay, so that when power is disconnected from the first transistor, the second transistor is turned on, and the relay is activated.

24. The system of claim 23 further comprising a charging circuit connected from the main battery to the reserve battery for maintaining the reserve battery in a charged state.

* * * * *